US012717366B2

(12) United States Patent
Tyrrell

(10) Patent No.: US 12,717,366 B2
(45) Date of Patent: Aug. 25, 2026

(54) OUTPUT CURRENT MEASUREMENT FOR LOW DROPOUT REGULATOR

(71) Applicant: Renesas Design (UK) Limited, Bourne End (GB)

(72) Inventor: Julian Tyrrell, Swindon (GB)

(73) Assignee: Renesas Design (UK) Limited, Bourne End (GB)

( * ) Notice: Subject to any disclaimer, the term of this patent is extended or adjusted under 35 U.S.C. 154(b) by 336 days.

(21) Appl. No.: 18/496,138

(22) Filed: Oct. 27, 2023

(65) Prior Publication Data

US 2025/0138563 A1 May 1, 2025

(51) Int. Cl.

*G05F 1/56* (2006.01)
*G05F 1/46* (2006.01)
*G05F 1/565* (2006.01)
*G05F 1/575* (2006.01)
*G05F 1/59* (2006.01)

(52) U.S. Cl.

CPC .............. *G05F 1/565* (2013.01); *G05F 1/468* (2013.01); *G05F 1/575* (2013.01); *G05F 1/59* (2013.01)

(58) Field of Classification Search

CPC .......... G05F 1/565; G05F 1/468; G05F 1/575; G05F 1/59

See application file for complete search history.

(56) References Cited

U.S. PATENT DOCUMENTS 7,679,345 B1 3/2010 Verma et al.
9,817,416 B2 11/2017 Gebeyehu et al.
9,870,014 B1 * 1/2018 Ham ....................... G05F 1/625
9,979,410 B2 5/2018 Wang et al.
10,203,709 B1 2/2019 Feng et al.
10,216,209 B1 2/2019 Ham et al.
10,845,831 B2 11/2020 Liu et al.
11,538,387 B1 12/2022 Lee et al.
12,326,748 B2 6/2025 Tornila Oliver et al.
2010/0164445 A1 7/2010 Verma et al.
2014/0266103 A1 9/2014 Wang et al.
2016/0282889 A1 * 9/2016 Mahajan ................. G05F 1/575
2017/0269620 A1 * 9/2017 Duong .................... G05F 1/575
2018/0267480 A1 * 9/2018 Mahajan ............... G04F 10/005
2018/0292851 A1 10/2018 Mahajan et al.
2019/0064860 A1 2/2019 Cho et al.
2019/0204862 A1 7/2019 Feng et al.
2021/0165437 A1 6/2021 Nasir et al.
2022/0308611 A1 9/2022 Kim et al.
2022/0327209 A1 10/2022 Schat (Continued)

OTHER PUBLICATIONS

US Ex Parte Quayle Action dated Oct. 1, 2025 issued in U.S. Appl. No. 18/496,218.

(Continued)

*Primary Examiner* — Lakaisha Jackson

(74) *Attorney, Agent, or Firm* — SCULLY, SCOTT, MURPHY & PRESSER, P.C.

(57) ABSTRACT

A current measurement system for a digital low dropout regulator (LDO) for receiving a reference voltage and generating an output voltage, the output voltage of the digital LDO being dependent on a first DAC code signal, the current measurement system comprising a current determination unit configured to receive the first DAC code signal, and generate an output current signal using the first DAC code signal.

19 Claims, 13 Drawing Sheets

(56) References Cited

U.S. PATENT DOCUMENTS

| | | | | |
|---|---|---|---|---|
| 2022/0397926 | A1 | 12/2022 | Bonomi | |
| 2024/0248504 | A1* | 7/2024 | Vargas | G05F 1/59 |
| 2025/0036150 | A1* | 1/2025 | Hung | G05F 1/575 |

OTHER PUBLICATIONS

X. Mao, Y. Lu and R. P. Martins, "A 1.2-A Calibration-Free Hybrid LDO With In-Loop Quantization and Auxiliary Constant Current Control Achieving High Accuracy and Fast DVS," in IEEE Transactions on Circuits and Systems I: Regular Papers, vol. 69, No. 11, pp. 4443-4452, Nov. 2022, doi: 10.1109/TCSI.2022.3198268. 10 pages.
J. Liu and N. Maghari, "A fully-synthesizable 0.6V digital LDO with dual-loop control using digital standard cells," 2016 14th IEEE International New Circuits and Systems Conference (NEWCAS), Vancouver, BC, Canada, 2016, pp. 1-4, doi: 10.1109/NEWCAS.2016.7604791. 4 pages.
US Non-Final Office Action dated Jul. 23, 2025 issued in U.S. Appl. No. 18/496,342.

* cited by examiner

OUTPUT CURRENT MEASUREMENT FOR LOW DROPOUT REGULATOR

The present disclosure relates to a current measurement system. In particular, the present disclosure relates to a current measurement system for a digital low dropout regulator (LDO).

BACKGROUND

FIG. 1A shows a digital LDO 100 as is known in the prior art (Jun Liu et. al., A Fully-Synthesizable 0.6V Digital LDO with Dual-Loop Control using Digital Standard Cells, 2016 14th IEEE International New Circuits and Systems Conference (NEWCAS), Vancouver, BC, Canada, 2016, pp. 1-4).

The LDO 100 comprises a main comparator 102; shift-registers 104, 106; a counter 108; a buffer 110; transistors 112, 114, 116, 118; panic circuitry 120 comprising comparators 122, 124 and a logic block 126; clock circuitry 128 comprising a multiplexer 130 and a frequency scaler 132; and a capacitor Co having equivalent series resistance (ESR) Ro.

The LDO 100 uses a coarse digital to analog converter (DAC) 134 and a fine DAC 136, each driven from an up-down counter 104, 106 and a clock control scheme 128 that times a response to a 'panic' detected by the window comparator provided by the panic circuitry 120.

The main control loop is the single comparator 102 (or 1-bitADC) that compares a feedback voltage VFB, that is derived from an output voltage VLDO, with a target voltage VREF.

The operation of the up-down counters 104, 106 acts as an integration function to an error signal CMP, so that the stability of the loop depends on the zero of the external decoupling capacitor Co, which has an ESR denoted by Ro.

When a "panic" is detected, i.e. the output voltage VLDO has exceeded the range as defined by the window comparator 120, the coarse and fine up-down counters 104, 106 are clocked at the full clock speed CLK, and the output current is ramped towards the new target value (either up or down) under control of the main comparator output CMP.

As the output of the DACs 134, 136 are essentially current sources provided by the transistors 112, 114, 116, 118, the output voltage VLDO is the integral of this current, so there is a 90° phase shift of the control to the output voltage VLDO. Typically, this results is a limit cycle of the DAC codes. As the capacitor Co has some ESR (denoted by Ro) the amplitude of the limit cycling reduces to a steady state. However, the "panic" mode fast clocking is a timed period, which in this example is 32 clock cycles. When the "panic" fast clocking timeout ends, the fine loop 136 is left to operate at 1/32nd of the clock speed.

The coarse and fine DAC outputs are controlled using a current mirror scheme. This has two benefits:

1. It keeps the switching operation and the dynamics of the LDO consistent, and the performance as expected.
2. It reduced the PSRR sensitivity of the output stage.

FIG. 1B is a schematic of a current mirror scheme 138 for controlling coarse and fine DAC outputs, as is known in the prior art (Xiangyu Mao et. al., A 1.2-A Calibration-Free Hybrid LDO With In-Loop Quantization and Auxiliary Constant Current Control Achieving High Accuracy and Fast DVS, IEEE Transactions on Circuits and Systems—I: Regular Papers, Vol. 69, No. 11, November 2022).

The current mirror scheme 138 comprises transistors 140, current sources 142, a capacitor 144, an amplifier 146 and a sink buffer 148.

SUMMARY

It is desirable to measure the output current of a digital LDO.

According to a first aspect of the disclosure there is provided a current measurement system for a digital low dropout regulator (LDO) for receiving a reference voltage and generating an output voltage, the output voltage of the digital LDO being dependent on a first DAC code signal, the current measurement system comprising a current determination unit configured to receive the first DAC code signal, and generate an output current signal using the first DAC code signal.

Optionally, the LDO comprises a comparison circuit configured to receive the reference voltage, receive a feedback voltage, the feedback voltage being dependent on the output voltage, compare the reference voltage and the feedback voltage, and generate an error signal that is dependent on the comparison between the reference voltage and the feedback voltage, and a first digital to analog converter configured to receive the error signal, generate the first DAC code signal based on the error signal.

Optionally, the comparison circuit comprises a main comparator or a 1-bit analog to digital converter.

Optionally, the first digital to analog converter comprises a first shift register configured to generate the first DAC code signal.

Optionally, the first shift register comprises an up-down counter.

Optionally, the first digital to analog converter comprises a plurality of first current sources, and each of the first current source functions as a bit of the first DAC code signal.

Optionally, each of the first current sources comprises a first transistor.

Optionally, the first shift register comprises a plurality of outputs, each output being associated with a single bit of the first DAC code signal and coupled to a gate of one of the plurality of first transistors.

Optionally, the first digital to analog converter comprises a plurality of first buffer circuits, each output being coupled to the gate of one of the plurality of first transistors via a buffer circuit.

Optionally, each of the first buffer circuits comprises a first inverter.

Optionally, the digital LDO comprises an output capacitor having an equivalent series resistance, the first DAC signal being provided to the output capacitor to generate the output voltage.

Optionally, the current determination unit is configured to generate the output current signal by calculating an output current using the first DAC code signal, and providing the output current signal using the calculated output current.

Optionally, the current determination unit is configured to calculate the output current by multiplying the first DAC code signal by a first variable.

Optionally, the current measurement system comprises an average current determination unit configured to receive the output current signal and to provide an average output current signal.

Optionally, the average current determination unit comprises a low pass filter.

Optionally, the low pass filter comprises an infinite impulse response (IIR) filter.

Optionally, the current measurement system comprises a warning circuit for indicating when the output current exceeds a first threshold current value or falls below a second threshold current value.

Optionally, the digital LDO comprises a panic circuit configured to detect when the feedback voltage exceeds a first threshold voltage value or falls below a second threshold voltage value, and control the first digital to analog converter to operate in a panic mode when the feedback voltage exceeds the first threshold voltage value or falls below the second threshold voltage value, and a clock circuit configured to provide a clock signal to the comparison circuit, operate in a fast mode during the panic mode by providing the clock signal at a first frequency, and operate in a slow mode, when not in the panic mode, by providing the clock signal at a second frequency, the second frequency being less than the first frequency, wherein the warning circuit is configured to indicate when the output current exceeds the first threshold current value or falls below the second threshold current value when the clock circuit is operating in the slow mode.

Optionally, the panic circuit is configured to output a panic signal in response to the detection of the feedback voltage exceeding the first threshold voltage value or falling below the second threshold voltage value, the panic signal being used to switch the first digital to analog converter to the panic mode.

Optionally, the panic circuit comprises a first comparator configured to compare the feedback voltage with the first threshold voltage value and a second comparator configured to compare the feedback voltage with the second threshold voltage value.

Optionally, the panic circuit comprises a logic circuit configured to receive outputs of the first and second comparators and to provide the panic signal in response to the first and second comparator outputs indicating that the feedback voltage has exceeded the first threshold voltage value or has fallen below the second threshold voltage value.

Optionally, the digital LDO comprises a counter circuit configured to receive the panic signal and the error signal, wherein the first digital to analog converter comprises a first shift register configured to generate the first DAC code signal, and the counter circuit is further configured to increment the first shift register whilst the first digital to analog converter is operating in the panic mode.

Optionally, the clock circuit comprises a multiplexer for receiving an input clock signal and a frequency scaling unit, the clock circuit is configured to provide the input clock signal as the clock signal during the fast mode, and the frequency scaling unit is configured to reduce the frequency of the input clock signal in the generation of the clock signal during the slow mode.

Optionally, the current measurement system comprises a first current mirror. configured to . . . .

Optionally, the digital LDO comprises a second digital to analog converter configured to receive the error signal, and generate a second DAC code signal based on the error signal, the output voltage being dependent on the second DAC code signal.

Optionally, the first digital to analog converter provides coarse control of the output voltage and the second digital to analog converter provides fine control of the output voltage.

Optionally, the current determination unit is configured to generate the output current signal using the second DAC code signal.

Optionally, the second digital to analog converter comprises a second shift register configured to generate the second DAC code signal.

Optionally, the second shift register comprises an up-down counter.

Optionally, the second digital to analog converter comprises a plurality of second current sources, wherein each of the second current sources functions as a bit of the second DAC code signal.

Optionally, each of the second current sources comprises a second transistor.

Optionally, the second shift register comprises a plurality of outputs, each output being associated with a single bit of the second DAC code signal and coupled to a gate of one of the plurality of second current sources.

Optionally, the second digital to analog converter comprises a plurality of second buffer circuits, each output being coupled to the gate of one of the plurality of second current sources via a buffer circuit.

Optionally, each of the second buffer circuits comprises a second inverter.

Optionally, the digital LDO comprises an output capacitor having an equivalent series resistance, the first and second DAC signals being provided to the output capacitor to generate the output voltage.

Optionally, the current determination unit is configured to generate the output current signal by calculating an output current using the first DAC code signal and the second DAC code signal, and providing the output current signal using the calculated output current.

Optionally, the current determination unit is configured to calculate the output current by adding the sum of the multiplication the first DAC code signal with a first variable to the multiplication of the second DAC code signal with a second variable.

According to a second aspect of the disclosure there is provided a voltage regulator system comprising a digital low dropout regulator (LDO) for receiving a reference voltage and generating an output voltage, and a current measurement system comprising a current determination unit configured to receive a first DAC code signal, an output voltage of the digital LDO being dependent on the first DAC code signal, and generate an output current signal using the first DAC code signal.

It will be appreciated that the voltage regulator of the second aspect may include features set out in the first aspect and can incorporate other features as described herein.

According to a third aspect of the disclosure there is provided a method of measuring a current from a digital low dropout regulator (LDO) for receiving a reference voltage and generating an output voltage, the output voltage of the digital LDO being dependent on a first DAC code signal, the method comprising receiving the first DAC code signal at a current determination unit, and generating an output current signal using the first DAC code signal, using the current determination unit.

It will be appreciated that the method of the third aspect may include features set out in the first aspect and/or the second aspect and can incorporate other features as described herein.

BRIEF DESCRIPTION OF THE DRAWINGS

The disclosure is described in further detail below by way of example and with reference to the accompanying drawings, in which.

DETAILED DESCRIPTION

Figure 2B:
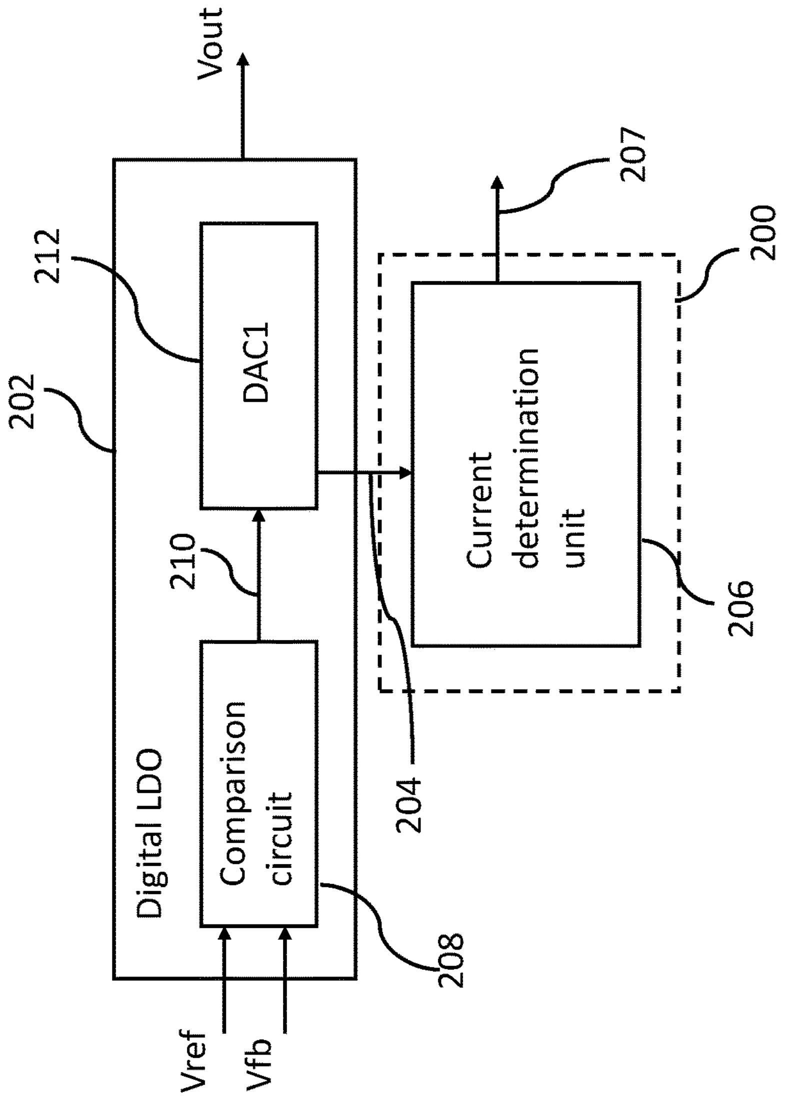
FIG. 2B is a schematic of the current measurement system with a specific example of the LDO.
Figure 2A:
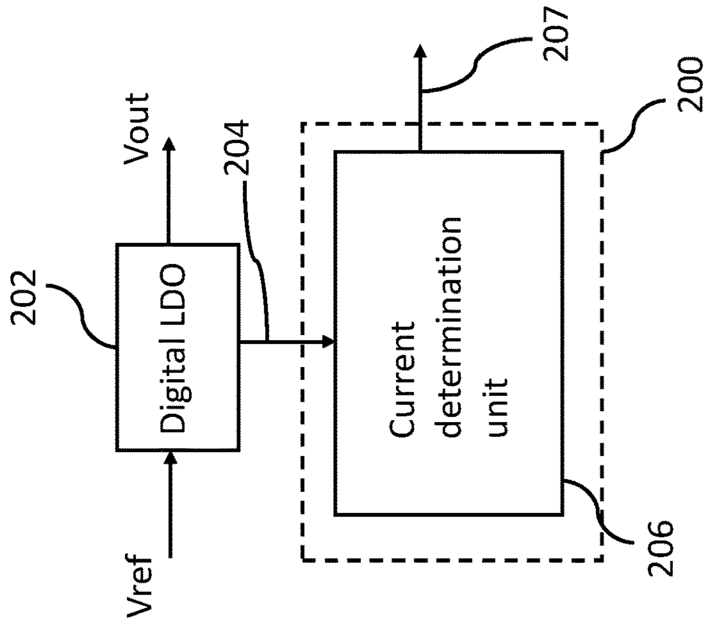
FIG. 2A is a schematic of a current measurement system for a digital LDO, in accordance with a first embodiment of the present disclosure.

FIG. 2A is a schematic of a current measurement system 200 for a digital LDO 202, in accordance with a first embodiment of the present disclosure. During operation, the digital LDO 202 receives a reference voltage Vref and generates an output voltage Vout. The output voltage Vout of the digital LDO 202 is dependent on a DAC code signal 204.

The current measurement system 200 comprises a current determination unit 206 that is configured to receive the DAC code signal 204 and to generate an output current signal 207 using the DAC code signal 204.

The current measurement system 200 may generate the output current signal 207 by performing a calculation using the DAC code signal 204 to calculate the output current, with the output current signal 207 being generated using the calculated output current.

The output current may also be referred to as a load current, where the load current is the current that is provided to a circuit component during operation of the LDO 202.

The output current may, for example, be calculated by multiplying the DAC code signal 204 by a variable, which may be represented by the following equation:

$$Iout = qq \times v1 \qquad (1)$$

where Iout is the output current, qq is the DAC code signal 204 and v1 is the variable.

If, for example, it is known that each bit of the DAC code signal 216 is indicative of a 10 mA current, having v1=10 mA will provide the output current Iout.

FIG. 2B is a schematic of the current measurement system 200 with a specific example of the LDO 202 comprising a comparison circuit 208 that is configured to receive the reference voltage Vref and a feedback voltage Vfb. The feedback voltage Vfb is dependent on the output voltage Vout of the LDO 202. For example, in a specific embodiment, the feedback voltage Vfb may be equal to the output voltage Vout, and in a further specific embodiment, the feedback voltage Vfb may be a scaled down version of the output voltage Vout.

In operation, the comparison circuit 208 compares the reference voltage Vref and the feedback voltage Vfb, and then generates an error signal 210 that is dependent on the comparison between the voltages Vref, Vfb. The comparison circuit 208 may, for example, comprise a main comparator or a 1-bit analog to digital converter. The error signal 210 may be indicative of the difference between the voltages Vref, Vfb.

The LDO 202 further comprises a digital to analog converter (DAC) 212 that receives the error signal 210 and generates the DAC code signal 204 based on the error signal 210.

Figure 2C:
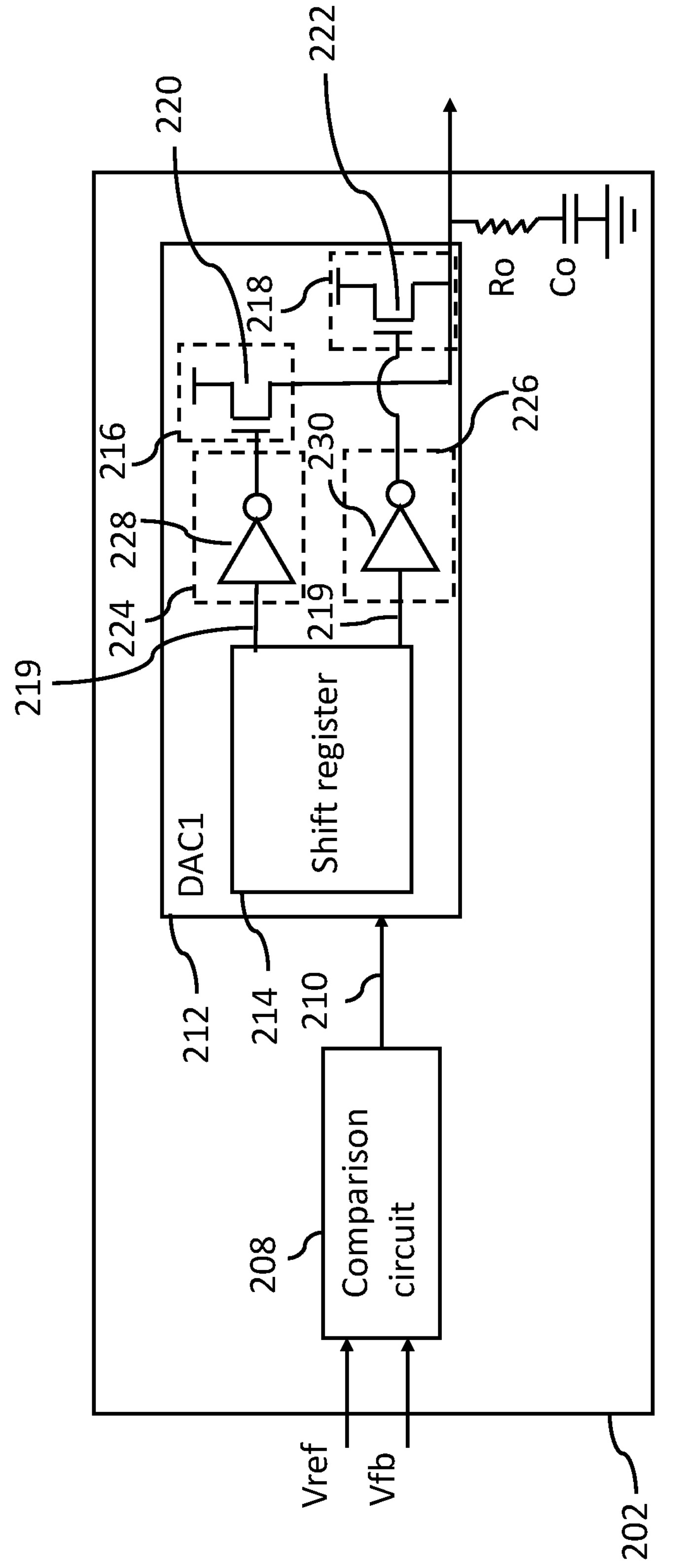
FIG. 2C is a schematic of a specific embodiment of the LDO as shown in FIG. 2B.

FIG. 2C is a schematic of a specific embodiment of the LDO 202 as shown in FIG. 2B and as may be used with any of the current measurement systems as described herein, in accordance with the understanding of the skilled person.

The DAC 212 comprises a shift register 214 that is configured to generate the DAC code signal 204. The shift register 214 may comprise an up-down counter.

The DAC 212 may comprise a plurality of current sources 216, 218 with each current source 216, 218 functioning as a bit of the DAC code signal 204. It will be appreciated that in the present embodiment, two current sources 216, 218 are shown, and further embodiments may comprise additional current sources, in accordance with the understanding of the skilled person. The current source 216 comprises a transistor 220 and the current source 218 comprises a transistor 222.

The shift register 214 provides a plurality of outputs 219. Each output 219 is associated with a single bit of the DAC code signal 204, and is coupled to a gate of one of the transistors 220, 222.

The DAC 212 takes a binary "word" (multiple bits with a scaled weighting). The DAC 212 may perform a binary to thermometer decode, for example:

$$001b = 0000001$$

$$101b = 0000011$$

$$\vdots$$

$$100b = 0001111$$

$$\vdots$$

$$111b = 1111111$$

So, there is one output current source per bit of the DAC code signal 204. The thermometer is easier to drive and match than binary weighted current sources, however mathematically they are identical. The shift register 214 may produce a thermometer count, which is often call a "walking one".

The DAC code signal 204 may be provided by the outputs 219 of the shift register 214. For example, if one output is 0 and the other output is 1, the DAC code signal 204 may have a value of 01. In this example, the DAC code signal 204 may be a single signal that indicates the value 01, or it may be formed from two distinct signals, with one of the signals having a value of 0 and the other having a value of 1, and collectively forming the DAC code signal 204. The bit values may also be extracted from the current sources 216, 218 to provide the DAC code signal 204.

The DAC 212 comprises buffer circuits 224, 226, with each of the outputs 219 being coupled to a gate via one of the buffer circuits 224, 226. The buffer circuits 224, 226 may each comprise an inverter. In the present embodiment, the buffer circuit 224 comprises an inverter 228 and the buffer circuit 226 comprises an inverter 230.

The LDO 202 may comprise an output capacitor Co having an equivalent series resistance (ESR) Ro, with the DAC signal 204 being provided to the output capacitor Co to generate the output voltage Vout. It should be noted that the resistor symbol denoted by Ro is an ESR of the capacitor Co and is therefore not a physical component that is separately implemented within the circuit.

Figure 3A:
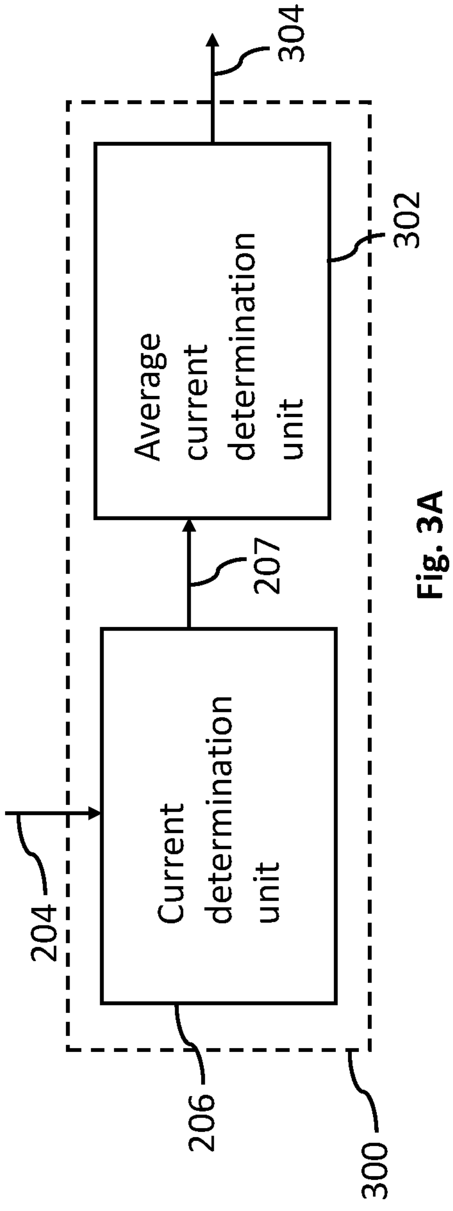
FIG. 3A is a schematic of a current measurement system in accordance with a second embodiment of the present disclosure.

FIG. 3A is a schematic of a current measurement system 300 in accordance with a second embodiment of the present disclosure. The current measurement system 300 comprises the current determination unit 206. The current measurement system 300 of the present embodiment further comprises an average current determination unit 302 that is configured to receive the output current signal 207 and to provide an average output current signal 304. The average output current signal 304 is indicative of the average output current of the LDO 202.

Figure 3B:
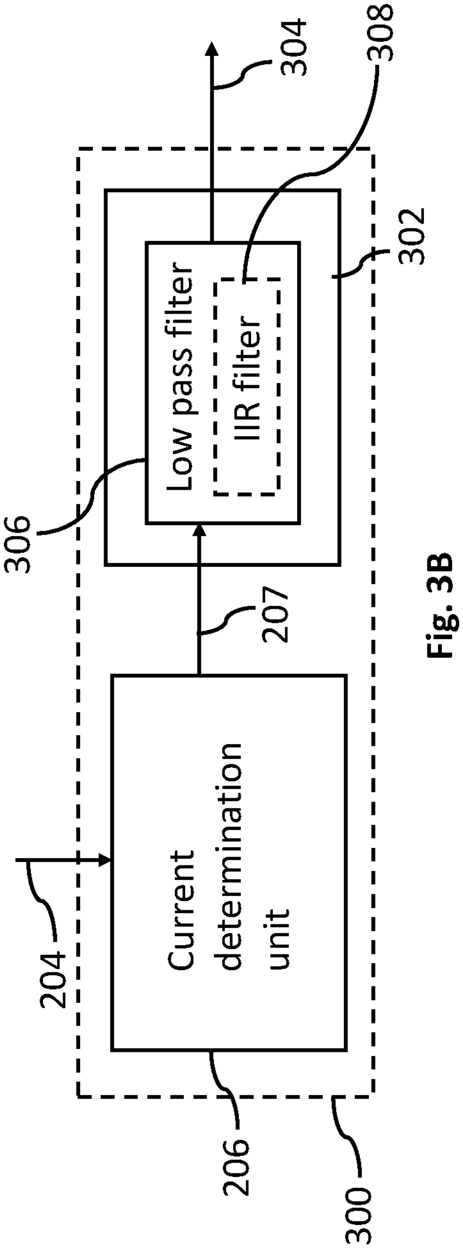
FIG. 3B is a schematic of the current measurement system showing a specific embodiment of the average current determination unit.

FIG. 3B is a schematic of the current measurement system 300 showing a specific embodiment of the average current determination unit 302. In the present embodiment, the average current determination unit 302 comprises a low pass filter 306 with the output current signal 207 being filtered by the low pass filter 306 to provide the average output current signal 304. The low pass filter 306 may comprise an infinite impulse response (IIR) filter 308.

Figure 3C:
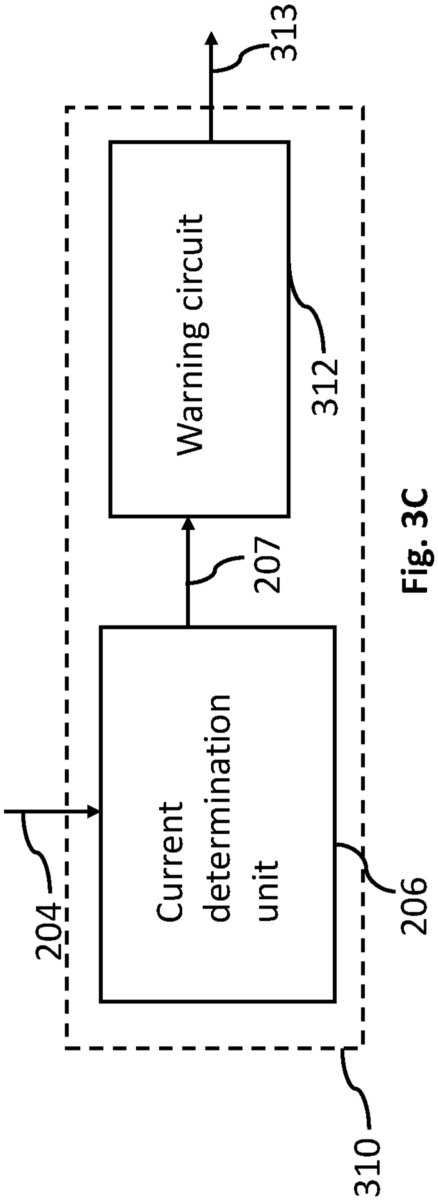
FIG. 3C is a schematic of a current measurement system in accordance with a third embodiment of the present disclosure.

FIG. 3C is a schematic of a current measurement system 310 in accordance with a third embodiment of the present disclosure. The current measurement system 310 comprises the current determination unit 206. The current measurement system 310 further comprises a warning circuit 312.

Figure 3D:
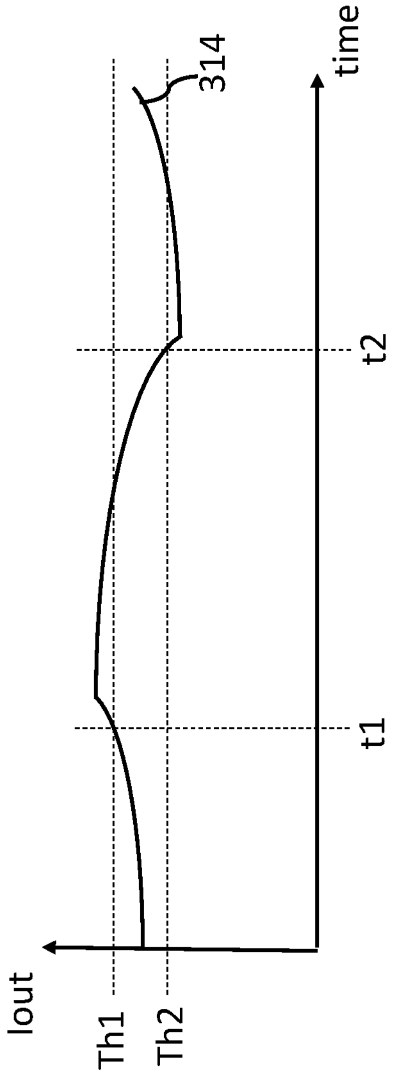
FIG. 3D is a time graph showing an example operation of the warning circuit, with the output current signal varying with time.

FIG. 3D is a time graph showing an example operation of the warning circuit 312, with the output current signal (shown by a trace 314) varying with time. Shown on the graph are two threshold current values Th1, Th2.

During operation, if the output current Iout exceeds the threshold Th1 (as illustrated by the output current signal rising above the threshold Th1 at a time t1) the warning circuit 312 indicates that the output current Iout has exceeded the threshold Th1. Similarly, if the output current falls below the threshold Th2, the warning circuit 312 indicates that the output current Iout has fallen below the threshold Th2, for example as shown at a time t2.

The warning circuit 312 may indicate that a threshold has been passed by providing an indicator signal 313 that may be provided to the LDO 202, the current measurements system 310 or any other suitable circuit or system, with the receiving circuit or system responding accordingly to the indication that a threshold current has been passed.

Figure 3E:
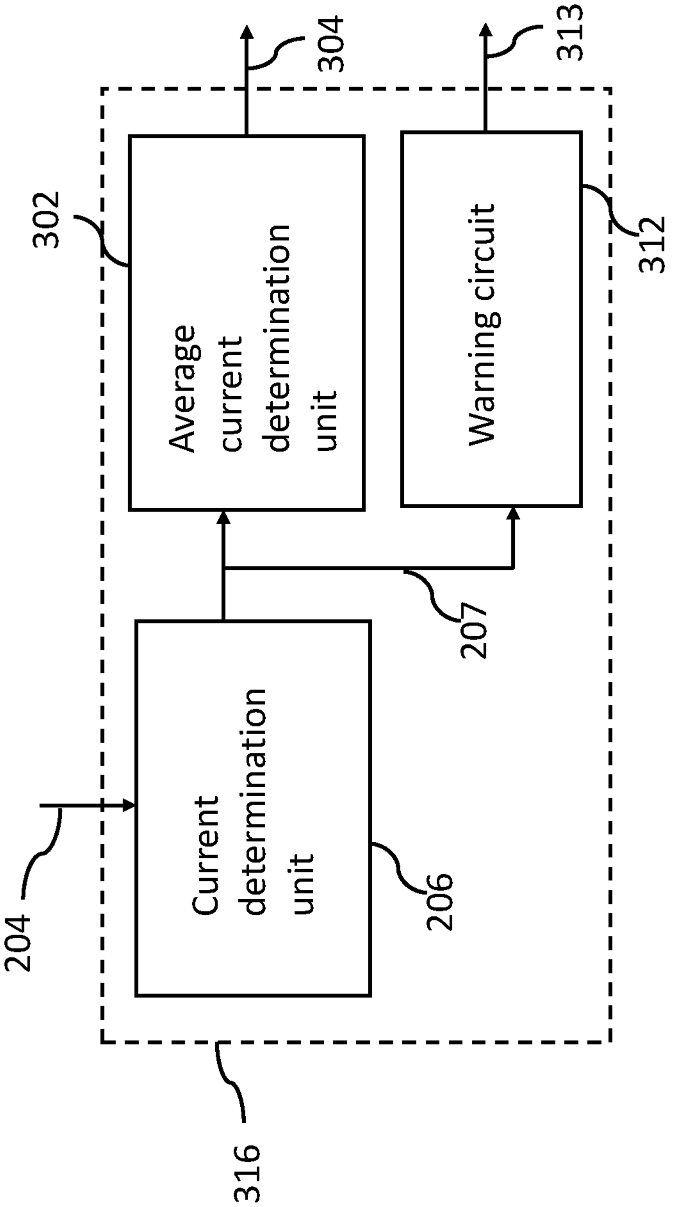
FIG. 3E is a schematic of a current measurement system in accordance with a fourth embodiment of the present disclosure.

FIG. 3E is a schematic of a current measurement system 316 in accordance with a fourth embodiment of the present disclosure. The current measurement system 316 comprises the current determination unit 206, the average current determination unit 302 and the warning circuit 312.

Figure 4A:
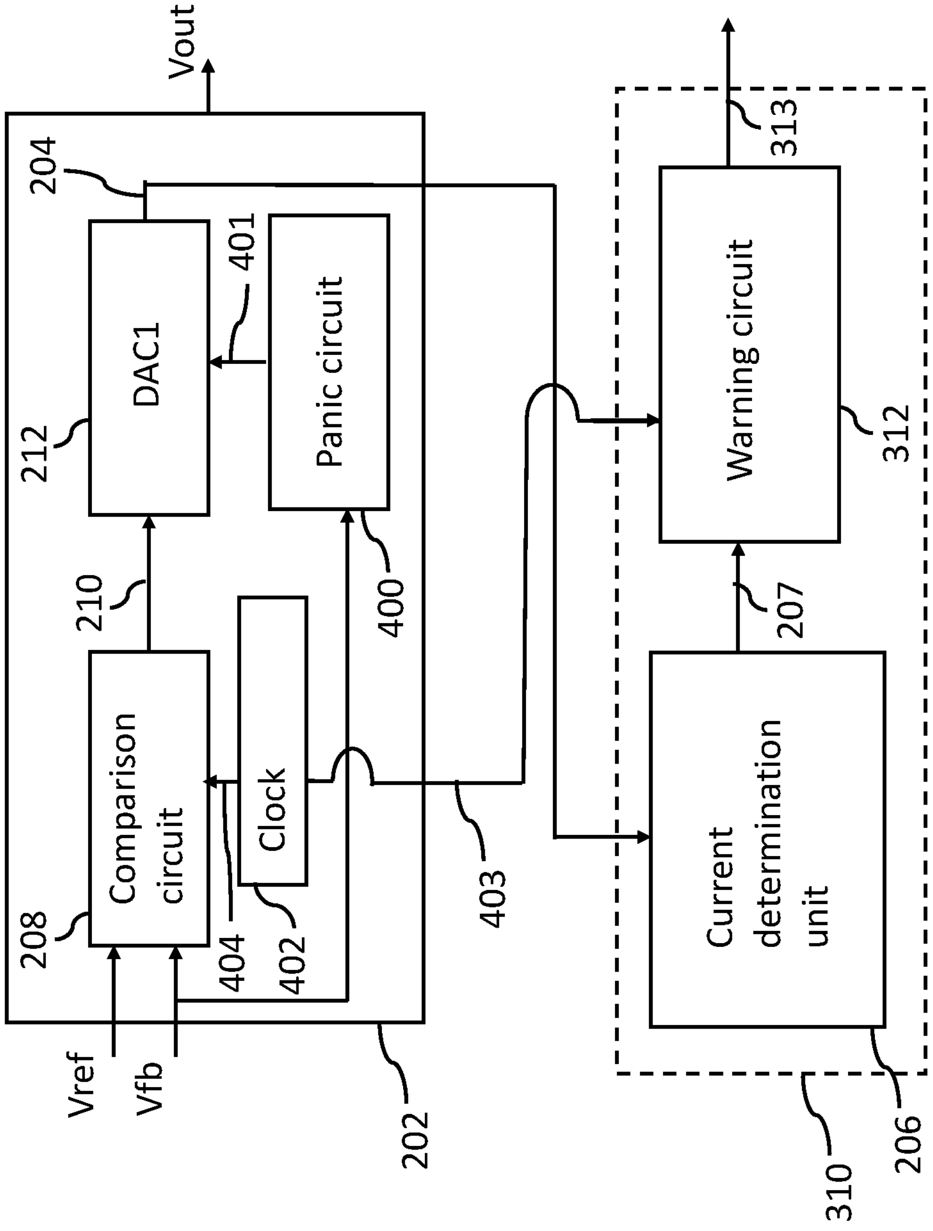
FIG. 4A is a schematic of a specific embodiment of the LDO used with the current measurement system of FIG. 3C, in accordance with a fifth embodiment of the present disclosure.

FIG. 4A is a schematic of a specific embodiment of the LDO 202 used with the current measurement system 310 of FIG. 3C, in accordance with a fifth embodiment of the present disclosure. It will be appreciated that in a further embodiment, the current measurement system 310 may be provided by the current measurement system 316 of FIG. 3E, or any other current measurement system in accordance with the understanding of the skilled person.

Figure 1B:
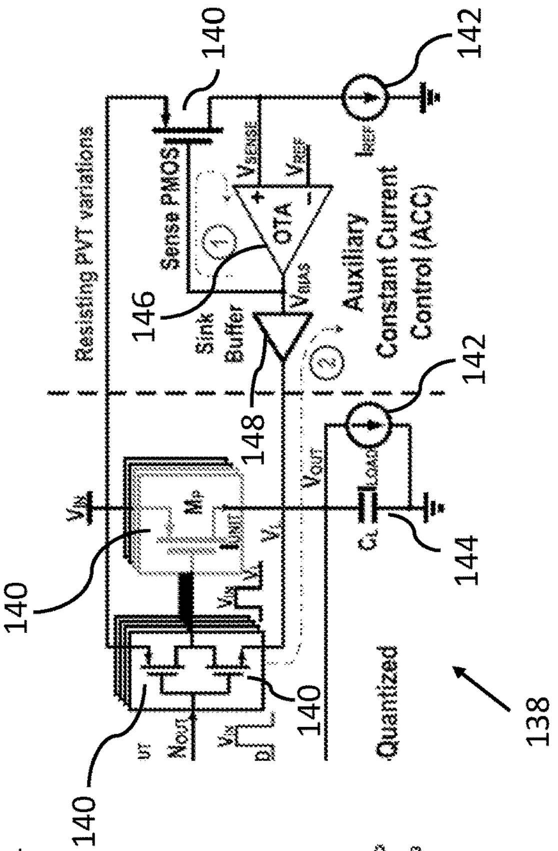
Fig. 1B (Prior Art)
FIG. 1B is a schematic of a current mirror scheme for controlling coarse and fine DAC outputs, as is known in the prior art.
Figure 1A:
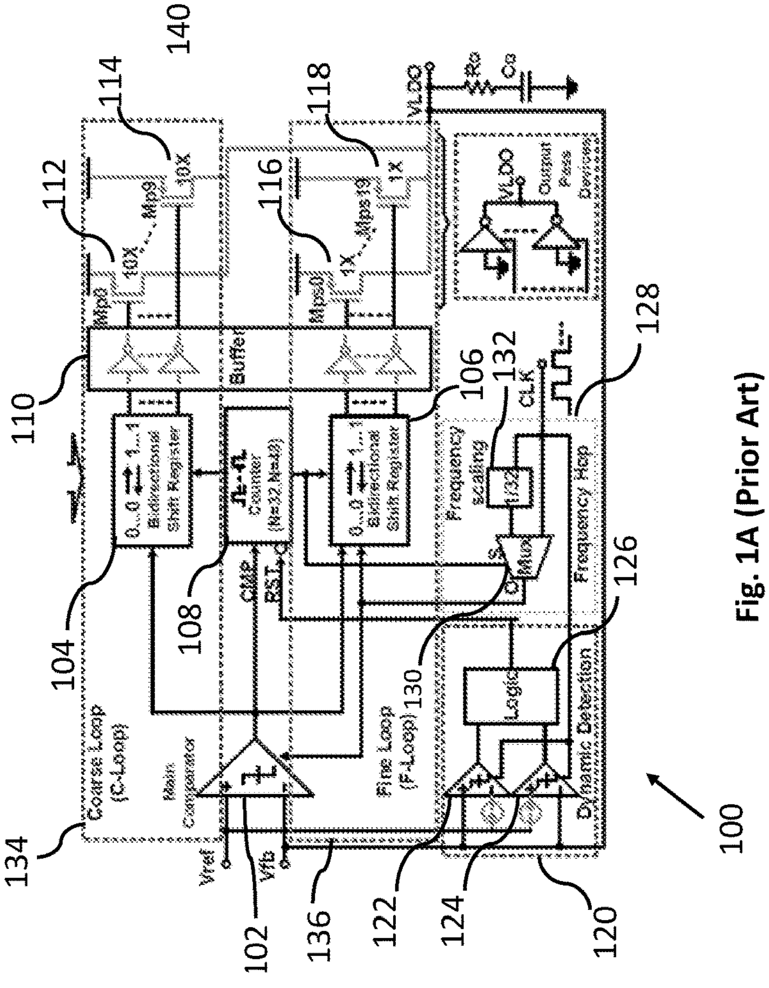
Fig. 1A (Prior Art)
FIG. 1A shows a digital LDO as is known in the prior art.

In the present embodiment, the LDO 202 comprises a panic circuit 400 that may function as the panic circuitry 120 as described in relation to FIG. 1A.

In operation, the panic circuit 400 that detects when the feedback voltage Vfb exceeds a first threshold voltage value Vref1 or falls below a second threshold voltage value Vref2 and, in response to the feedback voltage being outside of the normal operational range, triggers a panic condition. In the panic condition, the panic circuit 400 controls the DAC 212 to operate in a panic mode. This functionality may be provided by a panic signal 401 being generated by the panic circuit 400, that is then provided to the DAC 212 and switches the DAC 212 to the panic mode.

The LDO 202 further comprises a clock circuit 402 that may function as the clock circuitry 128 as described in relation to FIG. 1A. During operation, the clock circuit 402 provides a clock signal 404 to the comparison circuit 208. The clock circuit 402 operates in a fast mode during the panic mode, and a slow mode otherwise. During the fast mode, the clock circuit 402 provides the clock signal 404 at a higher frequency than the frequency provided during the slow mode.

In a specific embodiment, the warning circuit 312 functions to indicate that the output current has passed outside an operational window enclosed by the threshold values during the slow mode of the clock circuit 402.

In a specific embodiment, the warning circuit 312 may function to indicate that the output current has passed outside the operational window during the slow mode only, and not during the fast mode.

The warning circuit 312 may receive a signal 403 from the clock circuit 402, that indicates the current operational mode.

Figure 4B:
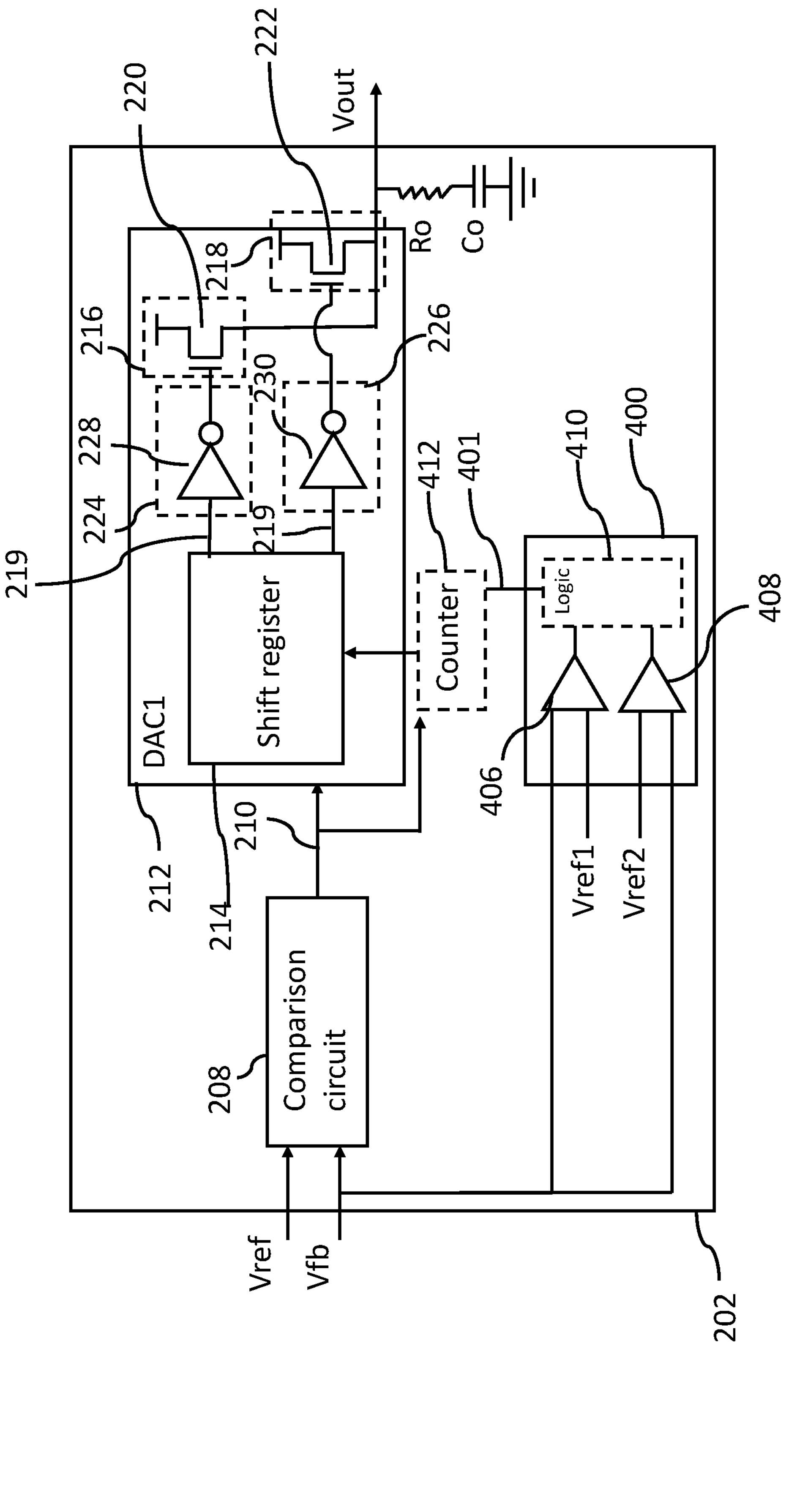
FIG. 4B is a schematic of a specific embodiment of the LDO that may be used with a current measurement system of the present disclosure such as the current measurement system of FIG. 3C, in accordance with a sixth embodiment of the present disclosure.
Figure 4C:
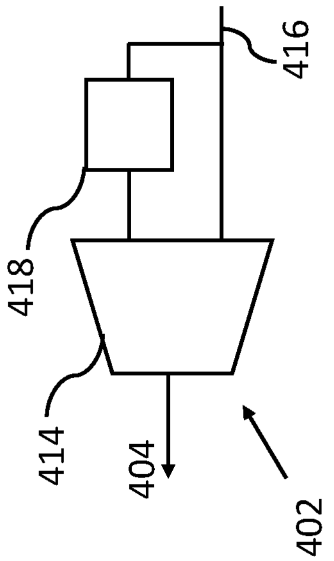

FIG. 4B is a schematic of a specific embodiment of the LDO 202 that may be used with a current measurement system of the present disclosure such as the current measurement system 310 of FIG. 3C, in accordance with a sixth embodiment of the present disclosure.

The panic circuit 400 comprises a comparator 406 configured to compare the feedback voltage Vfb with the threshold voltage value Vref1 and a comparator configured 408 to compare the feedback voltage Vfb with the threshold voltage value Vref2.

The panic circuit 400 may comprise a logic circuit 410 configured to receive outputs of the comparators 406, 408 and to provide the panic signal 401 in response to the comparator outputs indicating that the feedback voltage Vfb has exceeded the threshold voltage value Vref 1 or has fallen below the threshold voltage value Vref2.

The LDO 202 may comprise a counter circuit 412 configured to receive the panic signal 401 and the error signal 210. The counter circuit 412 is also configured to increment the shift register 214 whilst the DAC 212 is operating in the panic mode.

The clock circuit 402 may comprise a multiplexer 414 for receiving an input clock signal 416, and a frequency scaling unit 418. The clock circuit 402 is configured to provide the input clock signal 416 as the clock signal 404 during the fast mode, and the frequency scaling unit 418 is configured to reduce the frequency of the input clock signal 416 in the generation of the clock signal 404 during the slow mode.

Figure 5:
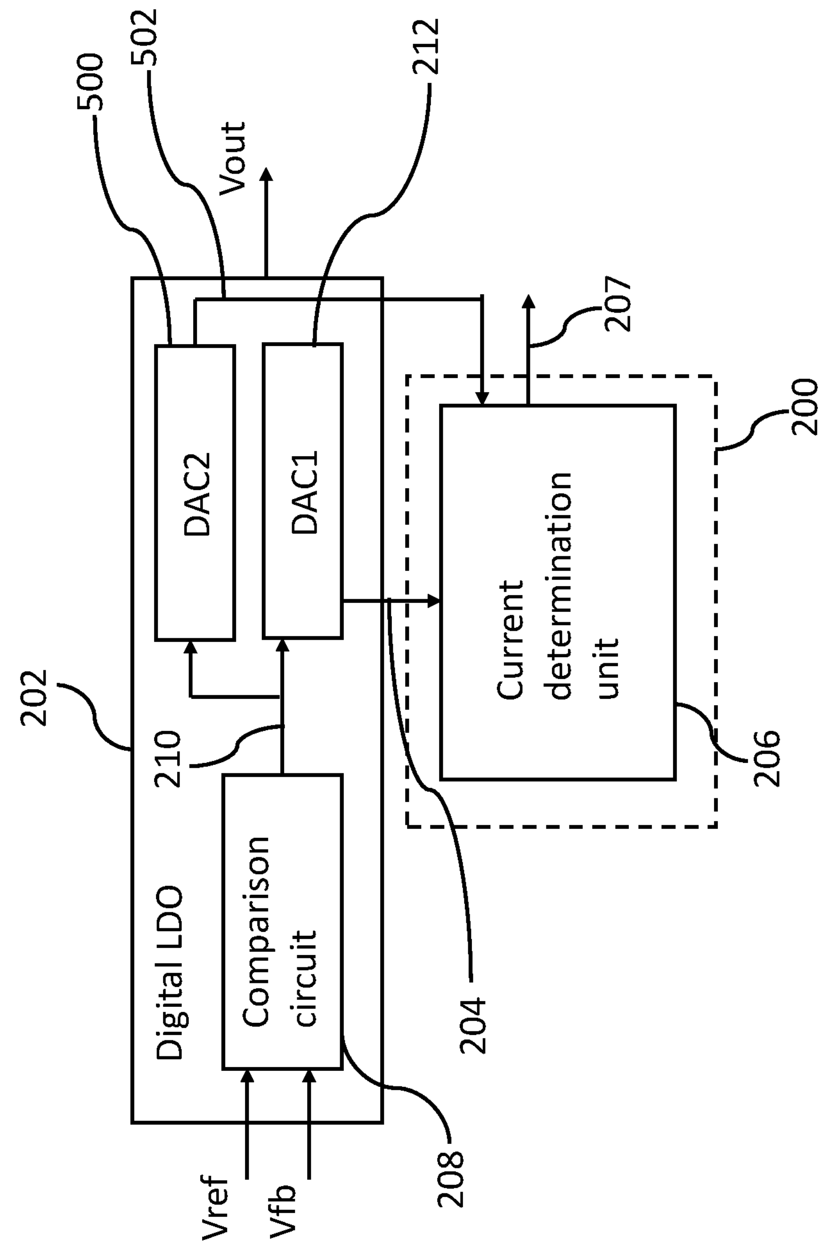
FIG. 5 is a schematic of a specific embodiment of the LDO used with the current measurement system of FIG. 2A, in accordance with a seventh embodiment of the present disclosure.

FIG. 5 is a schematic of a specific embodiment of the LDO 202 used with the current measurement system 200 of FIG. 2A, in accordance with a seventh embodiment of the present disclosure. It will be appreciated that in a further embodiment, the current measurement system 200 may be provided by any other current measurement system as described herein, in accordance with the understanding of the skilled person.

In the present embodiment, the LDO 202 comprises a DAC 500 that generates a DAC code signal 502. The operation of the DAC 500 will be clear to the skilled person based on the description of the DAC 212. Furthermore, in further embodiments, the DAC 500 may comprise any of the features described in relation to specific embodiments of the DAC 212, in accordance with the understanding of the skilled person. The DAC 212 may provide coarse control of the output voltage Vout and the DAC 500 may provide fine control of the output voltage Vout.

The current determination unit 206 may be configured to generate the output current signal 207 using both DAC code signals 204, 502. The current determination unit 206 may generate the output current signal 207 by performing a calculation using the DAC code signals 204, 502 to calculate the output current, with the output current signal 207 being generated using the calculated output current.

The output current may, for example be calculated by multiplying each of the DAC code signals 204, 502 by a variable, which may be represented by the following equation:

$$Iout = qq \times v1 + qqf \times v2 \qquad (2)$$

where Iout is the output current, qq is the DAC code signal 204, qqf is the DAC code signal 502, v1 is a first variable and v2 is a second variable.

Figure 6:
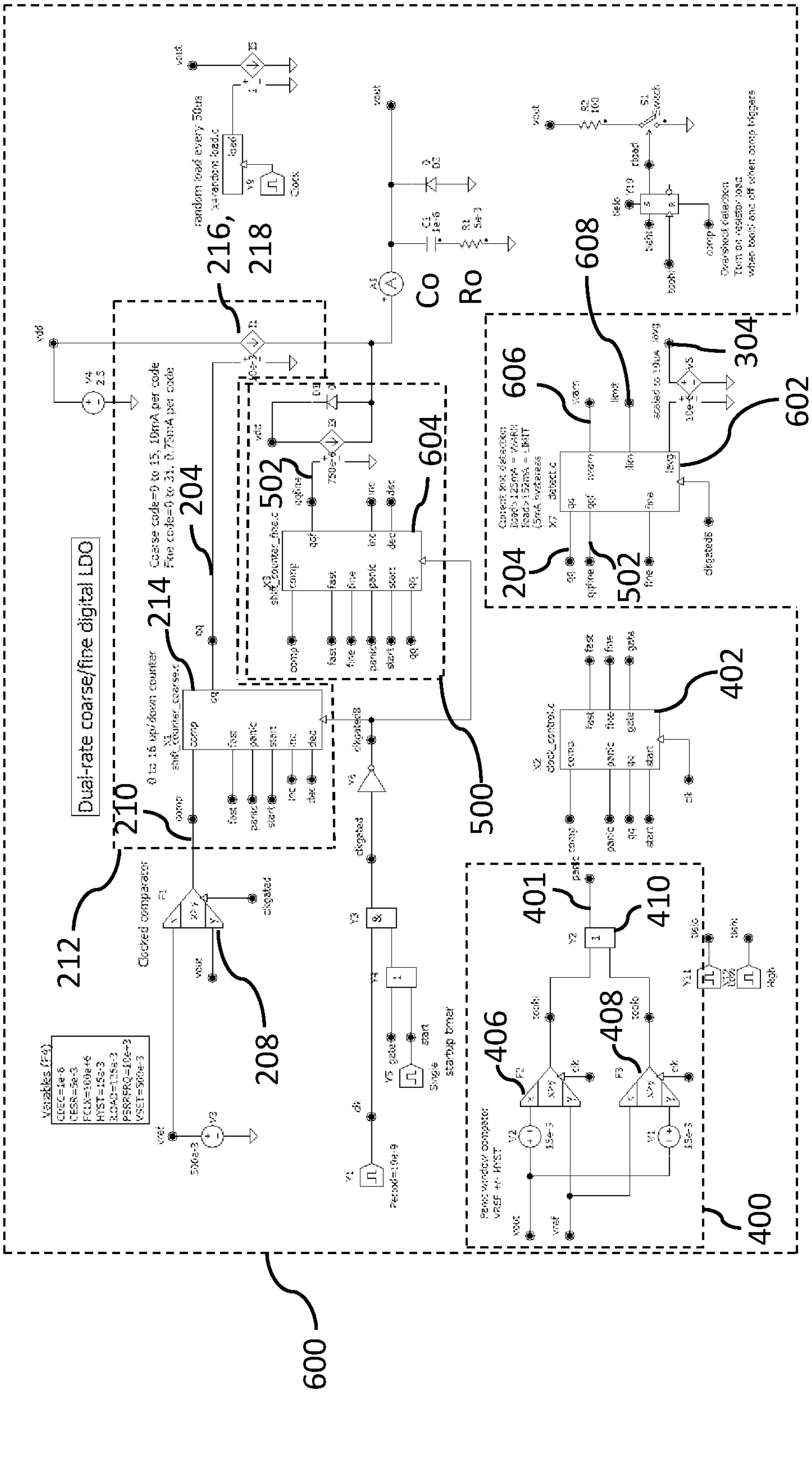
FIG. 6 is a schematic of a digital LDO and a current measurement system, in accordance with an eighth embodiment of the present disclosure.

FIG. 6 is a schematic of a digital LDO 600 and a current measurement system 602, in accordance with an eighth embodiment of the present disclosure. The digital LDO 600 comprises the following components:

- Clocked comparator (relating to the comparison circuit 208, as described previously). During operation, the clocked comparator 208 compares the target 'vref' voltage (previously labelled Vref) with the output 'vout' voltage (previously labelled Vout) and produces a 'comp' signal (previously referred to as the error signal 210) that is used by the coarse up-down counter (relating to a specific embodiment of the shift register 214) and the fine up-down counters (relating to a specific embodiment of the DAC 500 comprising a shift register 604).
- Panic comparators (relating to the specific implementation of the panic circuit 400). These form a window comparator and provides an output that is indicative of whether the output voltage vout is too high 'toohi' or too low 'toolo'. These are used to form the 'panic'.
- Shift_counter_coarse (previously described in relation to the shift register 214). In the present embodiment, this is a 4-bit up-down counter that controls the large coarse stepped DAC 212. In the current embodiment, each bit 216, 218 of the DAC 212 is a 10 mA current source, i.e. 0 to 150 mA output.
- Shift_counter_fine (previously described in relation to the shift register 604). In the present embodiment, this is a 5-bit up-down counter that controls the small fine stepped DAC 500. Each bit of the DAC 500 is a 750 μA current source, i.e. 0 to 23.23 mA output. The fine DAC 500 is scaled to be approximately 2.2 times larger than the coarse step. When the up-down counter 604 reaches the limit (31 or 0) it indicates an increment ('inc') or decrement ('dec') to the coarse counter 212 so that it remains within its controllable region. For example, when the upper limit of 31 is hit, an increment of the coarse DAC 212 adds 10 mA, so the fine DAC 500 subtracts the nearest of 9.25 mA, or 12 codes, so that the next output current increases by 1 fine DAC 500 step of 0.75 mA. This allows the control loop to accommodate slowly changing loads without triggering a 'panic'.
- Clock_control (previously described in relation to the clock circuit 402). In the present embodiment, the clock circuit 402 controls the duration of the panic mode signals ('fast' and 'fine') and divides the system clock for the slower fine control mode, by gating the clock every 16 cycles ('gate'), so the 'fine' mode runs at 1/16th of the clock speed.
- Detect, being the current measurement system 602 that may be provided by any of the current measurement systems described herein, and in accordance with the understanding of the skilled person. In the present embodiment, the current measurement system 602 is a telemetry block that warns and indicates when the output current (labelled "Iload") is reaching its maximum ('warn' and 'limit') using the coarse and fine DAC codes ('qq' and 'qqfine'). There is also a measurement of the output current, using a IIR filter and the DAC codes. In the present example, two different indicator signals are provided (labelled 606, 608), with indicator signal 606 being provided when the output current Iload exceeds 125 mA, and the indicator signal 608 being provided when the output current Iload exceeds 152 mA.
- Overshoot detection. This is a RS latch triggered pull-down resistor, used when the VOUT is above the 'tooHi' threshold. If the load current drops (say to zero) this is the active mechanism to discharge the output capacitor Co. In a further embodiment, tt can also be used to discharge the output when the LDO is turned off.

The current measurement system 602 of the present embodiment provides the functionality of the average current determination unit 302 by providing the average output current signal 304, and the warning circuit 312 by providing the current warning 606 and limit flags 608.

The measurement of the output current is a good indicator of the status, or health, of the load. It can give an indication of a fault or (impeding) failure to the system.

If the load exceeds the capability of the LDO, then the output voltage is not the required level and the 'warn' and 'limit' flags allow the system to determine its operational status.

An advantage of the digital LDO 600 is that the metrology of the operation is easily measured by digital means. As the coarse and fine DAC outputs 204, 502 are scaled currents this means the digital control values are a reasonable representation of the output current. Regardless of the actual output current, the coarse and fine DAC codes 204, 502 have numerical limits that define the maximum output current.

The 'warning' and 'limit' flags are simple numerical thresholds, with hysteresis, that can warn the system as required. The average output current is a scaled and low-pass filtered representation of the output DAC current.

For the present embodiment the output current may be generated using a scaled representation from the coarse and fine DAC codes:

```
// calculate current, in multiples of 10uA
current = qq * 1000 + qqf * 75;
```

Which is easily implemented using integer mathematics:

```
// calculate current, in multiples of 10uA
current = qq * 1000 + qqf * 75;
current = (qq<< 10) - (qq<< 4) - (qq<< 3) + (qqf<< 6) + (qqf<< 3) +
    (qqf<< 1) + qqf;
```

The warning and limit flags are hysteretic thresholds of this 'current' value. This is only flagged when the circuit is not responding to transients (i.e. when operating at the slow clock rate). Note 5=logic 1 and 0=logic 0.

```
//only flag when not reacting to transients
if(islow(fine))
{
  //125mA warn
  if(current>12500 && islow(iwarn)) iwarn=5;
  if(current<12000 && ishigh(iwarn)) iwarn=0;
  //152mA limit
  if(current>15200 && islow(ilim)) ilim=5;
  if(current<14700 && ishigh(ilim)) ilim=0;
}
```

The current measurement system 602 may comprise a current mirror (not shown), for example as illustrated in FIG. 1B and as presented in Xiangyu Mao et. al., A 1.2-A Calibration-Free Hybrid LDO With In-Loop Quantization and Auxiliary Constant Current Control Achieving High Accuracy and Fast DVS, IEEE Transactions on Circuits and Systems—I: Regular Papers, Vol. 69, No. 11, November 2022. By knowing that each 'coarse' and 'fine' DAC current step is a fixed value (within the trimming tolerance) then the calculation of the average current is accurate. Additionally the use of a current source (rather than just a on/off switched MOS) improves the PSRR (as stated in the cited paper).

Figure 7B:
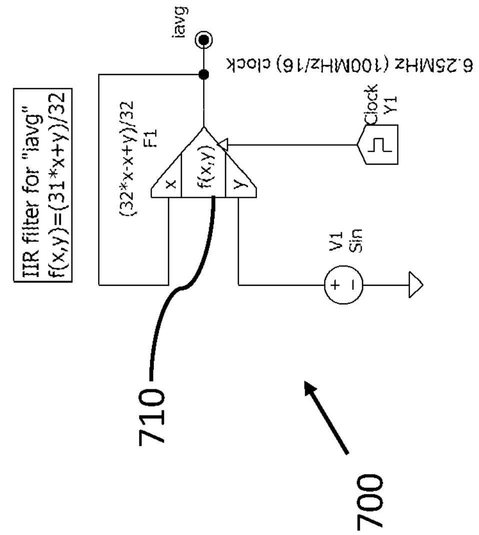
FIG. 7B is a schematic diagram of the IIR filter comprising a comparator.
Figure 7A:
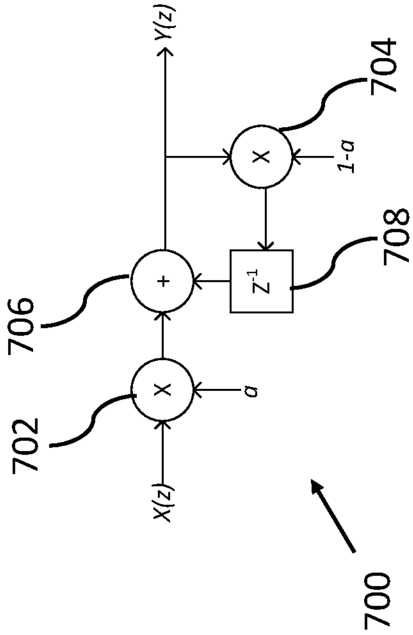
FIG. 7A is a block diagram of an IIR filter as may be implemented within the current measurement system to provide the average output current signal.

FIG. 7A is a block diagram of an IIR filter 700 as may be implemented within the current measurement system 602 to provide the average output current signal as described previously, for example, in relation to the average current determination unit 302 of FIG. 3B. IIR filtering of the fast and slow DAC current values, can be used to generate the average output current.

The IIR filter 700 comprises multiplication units 702, 704, and addition unit 706 and a unit delay block 708. FIG. 7B is a schematic diagram of the IIR filter comprising a comparator 710. The IIR filter 700 may be represented by the following transfer equation:

$$H(z) = \frac{Y(Z)}{X(z)} = \frac{a}{1-(1-a)Z^{-1}} \quad (3)$$

where a=32 in the present example.

The average current is providing using the IIR filter 700. In a specific embodiment, the following code may be used (which makes the integer mathematics simple). The calculated filter has 2 'decimal places' of precision, before an integer value is output.

```
// IIR filter of current value, with 2DP
icalc = floor((32 * icalc - icalc + 4 * current)/32);
// output iavg(1LSB = 10uA), without DP's
iavg = floor(icalc/4);
```

Figure 8:
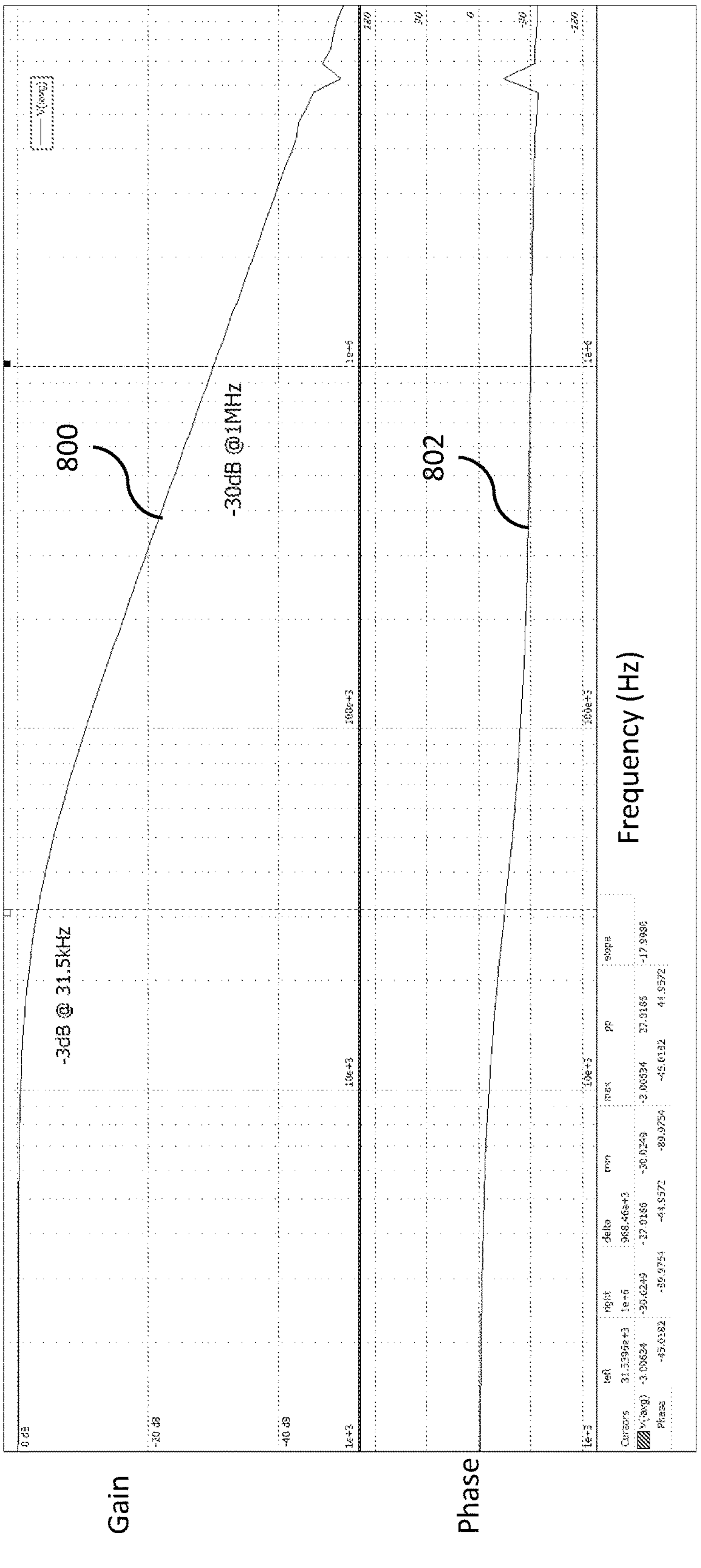
FIG. 8 is a graph showing simulation results for a practical implementation of the IIR filter.

FIG. 8 is a graph showing simulation results for a practical implementation of the IIR filter 700 where data is clocked at 6.25 MHz (100 MHz/16). The frequency response is shown in the graph, where the IIR filter 700 is shown to have a low-pass filter function with a −3 dB gain at 31.5 kHz (and −30 dB gain at 1 MHz). There is shown a gain (a trace 800) and a phase (a trace 802).

Various improvements and modifications can be made to the above without departing from the scope of the disclosure.

The invention claimed is:

1. A current measurement system for a digital low dropout regulator (LDO) for receiving a reference voltage and generating an output voltage, the output voltage of the digital LDO being dependent on a first DAC code signal, the current measurement system comprising:
- a current determination unit configured to:
  - receive the first DAC code signal;
  - calculating an output current using the first DAC code signal; and
  - generate an output current signal using the calculated output current.

2. The current measurement system of claim 1, wherein the LDO comprises:
- a comparison circuit configured to:
  - receive the reference voltage;
  - receive a feedback voltage, the feedback voltage being dependent on the output voltage;
  - compare the reference voltage and the feedback voltage; and
  - generate an error signal that is dependent on the comparison between the reference voltage and the feedback voltage; and
- a first digital to analog converter configured to:
  - receive the error signal;
  - generate the first DAC code signal based on the error signal.

3. The current measurement system of claim 2, wherein the first digital to analog converter comprises a first shift register configured to generate the first DAC code signal.

4. The current measurement system of claim 3, wherein:
- the first DAC code signal comprises a plurality of bits;
- the first digital to analog converter comprises a plurality of first current sources; and
- each of the plurality of first current sources functions as one of the plurality of bits of the first DAC code signal.

5. The current measurement system of claim 4, wherein each of the plurality of first current sources comprises a first transistor of a plurality of first transistors.

6. The current measurement system of claim 5, wherein the first shift register comprises a plurality of outputs, each of the plurality of outputs being associated with one of the plurality of bits of the first DAC code signal and coupled to a gate of one of the plurality of first transistors.

7. The current measurement system of claim 6, wherein the first digital to analog converter comprises a plurality of first buffer circuits, each of the plurality of outputs of the first shift register being coupled to the gate of one of the plurality of first transistors via one of the plurality of first buffer circuits.

8. The current measurement system of claim 1, wherein the current determination unit is configured to calculate the output current by multiplying the first DAC code signal by a first variable.

9. The current measurement system of claim 1 comprising an average current determination unit configured to receive the output current signal and to provide an average output current signal.

10. The current measurement system of claim 9, wherein the average current determination unit comprises a low pass filter.

11. The current measurement system of claim 10, wherein the low pass filter comprises an infinite impulse response (IIR) filter.

12. The current measurement system of claim 1 comprising a warning circuit for indicating when an output current exceeds a first threshold current value or falls below a second threshold current value.

13. The current measurement system of claim 12, wherein the digital LDO comprises:

a panic circuit configured to:

detect when a feedback voltage exceeds a first threshold voltage value or falls below a second threshold voltage value; and control a first digital to analog converter to operate in a panic mode when the feedback voltage exceeds the first threshold voltage value or falls below the second threshold voltage value; and a clock circuit configured to:

provide a clock signal to a comparison circuit;

operate in a fast mode during the panic mode by providing the clock signal at a first frequency; and operate in a slow mode, when not in the panic mode, by providing the clock signal at a second frequency, the second frequency being less than the first frequency, wherein the warning circuit is configured to indicate when the output current exceeds the first threshold current value or falls below the second threshold current value when the clock circuit is operating in the slow mode.

14. The current measurement system of claim 1, wherein the digital LDO comprises a second digital to analog converter configured to:

receive an error signal; and generate a second DAC code signal based on the error signal, the output voltage being dependent on the second DAC code signal.

15. The current measurement system of claim 14, wherein the current determination unit is configured to generate the output current signal using the second DAC code signal.

16. The current measurement system of claim 15, wherein the current determination unit is configured to generate the output current signal by calculating the output current using the first DAC code signal and the second DAC code signal.

17. The current measurement system of claim 16, wherein the current determination unit is configured to calculate the output current by adding a sum of a multiplication of the first DAC code signal with a first variable to the multiplication of the second DAC code signal with a second variable.

18. A voltage regulator system comprising:

a digital low dropout regulator (LDO) for receiving a reference voltage and generating an output voltage; and a current measurement system comprising:

a current determination unit configured to:

receive a first DAC code signal, the output voltage of the digital LDO being dependent on the first DAC code signal;

calculate an output current using the first DAC code signal; and generate an output current signal using the calculated output current.

19. A method of measuring a current from a digital low dropout regulator (LDO) for receiving a reference voltage and generating an output voltage, the output voltage of the digital LDO being dependent on a first DAC code signal, the method comprising:

receiving the first DAC code signal at a current determination unit;

calculating an output current using the first DAC code signal; and generating an output current signal using the first DAC code signal, using the calculated output current.

* * * * *